US008984434B2

(12) United States Patent (10) Patent No.: US 8,984,434 B2
Naderi et al. (45) Date of Patent: *Mar. 17, 2015

(54) COMPUTER IMPLEMENTED METHODS AND APPARATUS FOR DYNAMIC WINDOWING IN USER INTERFACES

(71) Applicant: salesforce.com, inc., San Francisco, CA (US)

(72) Inventors: Nadia Naderi, Tiburon, CA (US); Patrick Beyries, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/244,318

(22) Filed: Apr. 3, 2014

(65) Prior Publication Data

US 2014/0215345 A1 Jul. 31, 2014

Related U.S. Application Data

(63) Continuation of application No. 13/280,114, filed on Oct. 24, 2011, now Pat. No. 8,732,606.

(60) Provisional application No. 61/406,545, filed on Oct. 25, 2010.

(51) Int. Cl.
*G06F 15/00* (2006.01)
*G06F 13/00* (2006.01)
*G06F 3/0481* (2013.01)
*G06F 9/44* (2006.01)

(52) U.S. Cl.
CPC ............... *G06F 3/0481* (2013.01); *G06F 8/38* (2013.01)
USPC ........................................ 715/781; 715/851

(58) Field of Classification Search
CPC ................................ G06F 3/0481; G06F 8/38
USPC .................. 715/776, 799, 781–783, 744, 752
See application file for complete search history.

(56) References Cited

U.S. PATENT DOCUMENTS 5,577,188 A 11/1996 Zhu
5,608,872 A 3/1997 Schwartz et al.
(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

(Continued)

*Primary Examiner* — Kevin Nguyen
(74) *Attorney, Agent, or Firm* — Weaver Austin Villeneuve & Sampson LLP

(57) ABSTRACT

Disclosed are implementations of methods, apparatus, systems, and computer-readable storage media for rendering information. In some implementations, user interface data including content capable of being displayed on a page is received. A dynamic window including one or more link linked with respective identifiable portions of the content on the page can be generated. The page of content and the dynamic window can be displayed in a user interface on a display of a computing device. The user interface can have a first state in which a first view of the page of content is displayed and a second state in which a second view of the page is displayed, where the second view is different from the first view. The dynamic window is capable of remaining displayed independent of a change of the user interface from the first state to the second state.

20 Claims, 10 Drawing Sheets

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Assal et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,732,606 B2 | 5/2014 | Naderi et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0156814 A1 | 10/2002 | Ho |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |

(56) References Cited

U.S. PATENT DOCUMENTS

| | | |
|---|---|---|
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0174332 A1 | 7/2007 | Stephens |
| 2008/0148188 A1 | 6/2008 | Read |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0145754 A1* | 6/2011 | Lira .......................... 715/784 |
| 2012/0233137 A1 | 9/2012 | Jakobson et al. |
| 2012/0290407 A1 | 11/2012 | Hubbard et al. |
| 2012/0311491 A1 | 12/2012 | Melton et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |

OTHER PUBLICATIONS

US Office Action mailed Sep. 30, 2013 for U.S. Appl. No. 13/280,114.

Notice of Allowance mailed Jan. 6, 2014 for U.S. Appl. No. 13/280,114.

* cited by examiner

COMPUTER IMPLEMENTED METHODS AND APPARATUS FOR DYNAMIC WINDOWING IN USER INTERFACES

PRIORITY AND RELATED APPLICATION DATA

This application claims priority to co-pending and commonly assigned U.S. patent application Ser. No. 13/280,114, titled "Computer Implemented Methods and Apparatus for Dynamic Windowing in User Interfaces," by Naderi, et al., filed on Oct. 24, 2011, which claims priority to U.S. Provisional Patent Application No. 61/406,545, titled "Dynamic Windowing for Computer User Interfaces" by Naderi, et al., filed on Oct. 25, 2010, both of which are hereby incorporated by reference in their entirety and for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present application relates generally to computing device user interfaces and, more specifically, to techniques for generating and updating dynamic windows in such user interfaces.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

Web browser programs and software applications can be provided on a computing system and are sometimes implemented in a cloud computing environment. Such browser programs and software applications often present data as long vertical pages of information, which do not fit on a graphical user interface displayed on a computer display. For instance, some web sites have data formatted as a single page with a long flow of information, where only a portion of the information is visible at a particular time. As a result, a user often has to waste time and resources to scroll or page up/down many times on a page to find and consume information in different areas of the page.

BRIEF DESCRIPTION OF THE DRAWINGS

The included drawings are for illustrative purposes and serve only to provide examples of possible structures and process operations for the disclosed inventive computer implemented systems, apparatus, and methods for dynamic windowing in user interfaces. These drawings in no way limit any changes in form and detail that may be made by one skilled in the art without departing from the spirit and scope of the disclosed implementations.

FIG. 7 shows a screen display of an example of a graphical user interface 700 rendered on a computing device, in accordance with some implementations.

FIG. 8 shows a screen display of an example of a graphical user interface 800 rendered on a computing device, in accordance with some implementations.

DETAILED DESCRIPTION

Figure 1A:
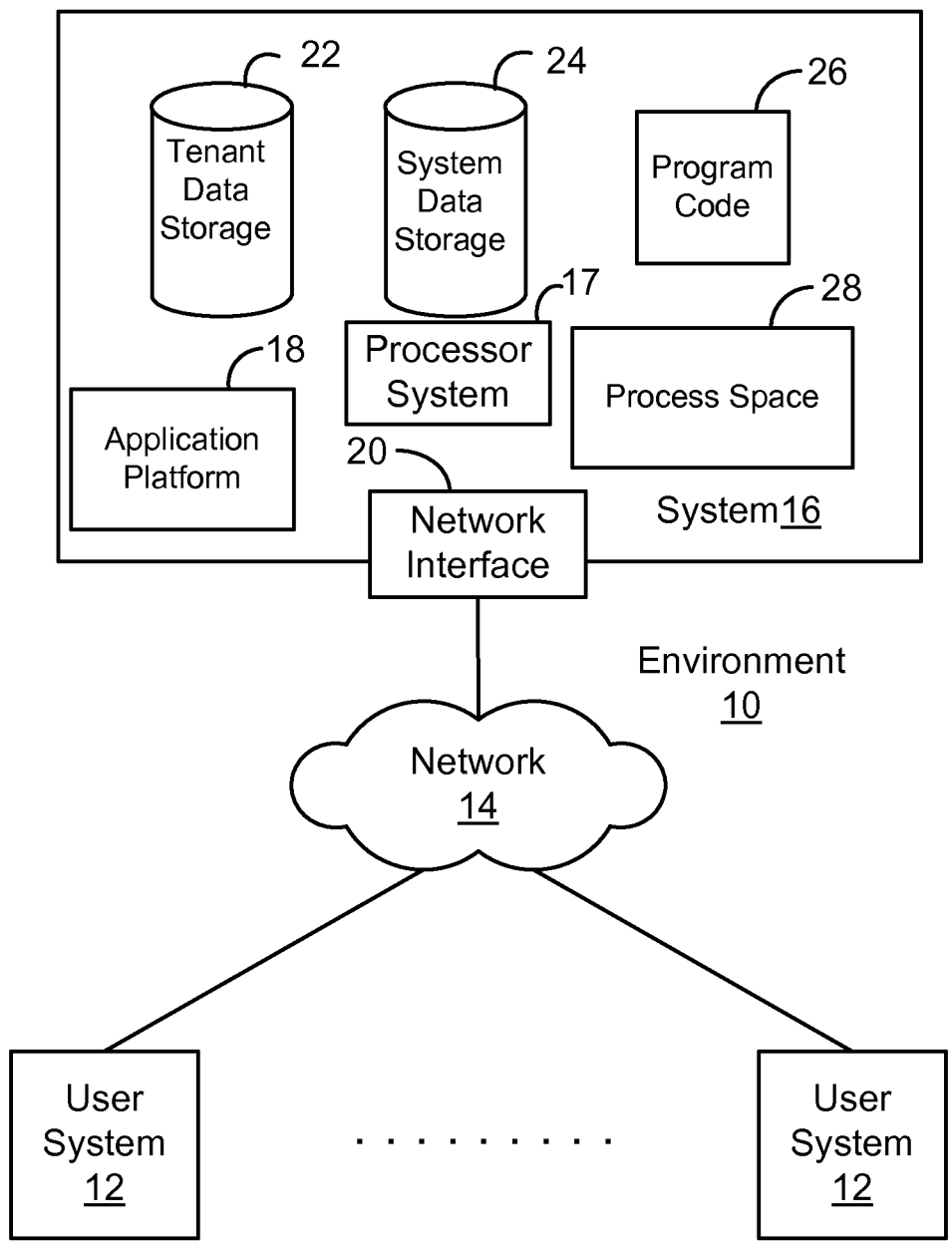
FIG. 1A shows a block diagram of an example of an environment 10 in which an on-demand database service can be used in accordance with some implementations.

Examples of systems, apparatus, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations, also referred to herein as "blocks," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different methods, apparatus, systems, and computer program products for implementing dynamic windows in computer user interfaces. In some implementations, the disclosed methods, apparatus, systems, and computer program products may be configured or designed for use with software applications and web browser programs and, in some instances, in a multi-tenant database environment.

In some implementations, the disclosed dynamic window architectures and techniques are used in computer systems to efficiently render information on graphical user interfaces of one or more display devices. In some examples, features include persistent on-page links, which are organized and presented in a dynamic window to facilitate location and navigation to the links for quick access to page sections and other types of content regardless of which part of the page is currently displayed. The on-page links can remain displayed independent of user navigation actions. In some instances, the dynamic window in which the links are displayed is fixed on the page and remains in-place as the page scrolls, allowing for direct access to various sections and content from any page location. This can reduce scrolling and page up/down actions of a user to access such content, thereby increasing the speed and efficiency of using web pages and/or application pages having a large volume of content and/or data associated therewith. In some instances, the disclosed techniques facilitate the access and manipulation of long vertical pages and pages with many separate sections.

Some implementations of the disclosed methods, apparatus, systems, and computer program products can be realized using a variety of programming languages including HTML, Javascript, Java, and others. By way of example, links can be generated on-the-fly for each section, heading, or other significant piece of content on a page when the page is loaded in a program or application. The resulting set of links can be formatted to minimize the amount of space used but to allow for easy access and navigation to the links. In some instances, scroll arrows in or otherwise associated with the dynamic window may be used to provide navigation and access to additional links, which may not fit in the displayed dynamic window. Some implementations of the disclosed methods, apparatus, systems, and computer program products provide for customization of the dynamic window, including selection, addition, deletion, and modification of the links displayed in the window. For example, in a web browsing session, a user can update the display and functionality of the links in a dynamic window to accommodate user preferences. Such updates can be saved for future browsing sessions.

These and other implementations may be embodied in various types of hardware, software, firmware, and combinations thereof. For example, some techniques disclosed herein may be implemented, at least in part, by machine-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of machine-readable media include, but are not limited to, magnetic media such as hard disks, floppy disks, and magnetic tape; optical media such as CD-ROM disks; magneto-optical media; and hardware devices that are specially configured to store program instructions, such as read-only memory devices ("ROM") and random access memory ("RAM"). These and other features of the disclosed implementations will be described in more detail below with reference to the associated drawings.

The term "multi-tenant database system" can refer to those systems in which various elements of hardware and software of a database system may be shared by one or more customers. For example, a given application server may simultaneously process requests for a great number of customers, and a given database table may store rows for a potentially much greater number of customers. The term "query plan" generally refers to one or more operations used to access information in a database system.

A "user profile" or "user's profile" is generally configured to store and maintain data about the user of the database system. The data can include general information, such as title, phone number, a photo, a biographical summary, and a status (e.g., text describing what the user is currently doing). As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a subscriber (custom object). For example, a record can be for a business partner or potential business partner (e.g., a client, vendor, distributor, etc.) of the user, and can include an entire company, subsidiaries, or contacts at the company. As another example, a record can be a project that the user is working on, such as an opportunity (e.g., a possible sale) with an existing partner, or a project that the user is trying to get. In one implementation of a multi-tenant database, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

FIG. 1A illustrates a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be any machine or system that is used by a user to access a database system 16. For example, any of user systems 12 can be a handheld computing device, a mobile phone, a laptop computer, a workstation, and/or a network of such computing devices. As illustrated in FIG. 1A (and in more detail in FIG. 1B) user systems 12 might interact via a network 14 with an on-demand database service, which is implemented in the example of FIG. 1A as database system 16.

An on-demand database service, such as system 16, is a database system that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 1A, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in storage medium(s) 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 1B:
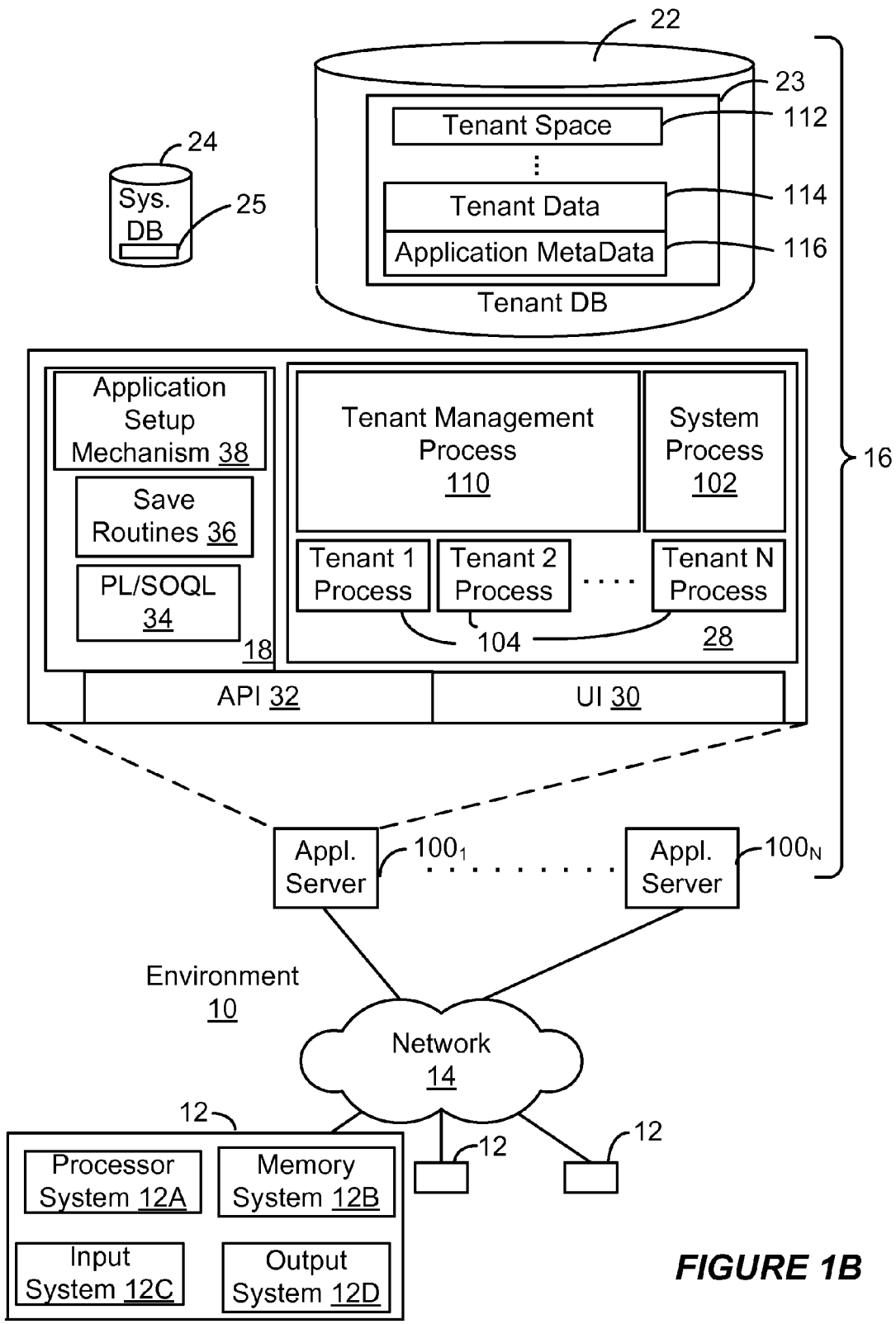
FIG. 1B shows a block diagram of an example of some implementations of elements of FIG. 1A and various possible interconnections between these elements.

One arrangement for elements of system 16 is shown in FIGS. 1A and 1B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1A include conventional, well-known elements that are explained only briefly here. For example, each user system 12 could include a desktop personal computer, workstation, laptop, PDA, cell phone, or any wireless access protocol (WAP) enabled device or any other type of computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display device (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s)

including computer code to run using processor system 17, which may be implemented to include a central processing unit, which may include an Intel Pentium® processor or the like, and/or multiple processor units. A computer program product implementation includes a non-transitory machine-readable storage medium (media) having instructions stored thereon/in, which can be used to program a computer to perform any of the processes/methods of the implementations described herein. Computer program code 26 for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computing device or system, including processing hardware and process space(s), that can be operated in conjunction with an associated storage system and database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 1B illustrates a block diagram of an example of some implementations of elements of FIG. 1A and various possible interconnections between these elements. That is, FIG. 1B also illustrates environment 10. However, in FIG. 1B elements of system 16 and various interconnections in some implementations are further illustrated. FIG. 1B shows that user system 12 may include processor system 12A, memory system 12B, input system 12C, and output system 12D. FIG. 1B shows network 14 and system 16. FIG. 1B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers 100₁-100ₙ, system process space 102, tenant process spaces 104, tenant management process space 110, tenant storage area 112, user storage 114, and application metadata 116. In other implementations, environment 10 may not have the same elements as those listed above and/or may have other elements instead of, or in addition to, those listed above.

User system 12, network 14, system 16, tenant data storage 22, and system data storage 24 were discussed above in FIG. 1A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 1B, system 16 may include a network interface 20 (of FIG. 1A) implemented as a set of HTTP application servers 100, an application platform 18, tenant data storage 22, and system data storage 24. Also shown is system process space 102, including individual tenant process spaces 104 and a tenant management process space 110. Each application server 100 may be configured to communicate with tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle| databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language implementations is discussed in commonly owned U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is hereby incorporated by reference in its entirety and for all purposes. Invocations to applications may be detected by one or more system processes, which manage retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server 1001 might be coupled via the network 14 (e.g., the Internet), another application server 100N-1 might be coupled via a direct network link, and another application server 100N might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain implementations, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one implementation, therefore, an interface system implementing a load balancing function (e.g., an F5 Big-IP load balancer) is communicably coupled between the application servers 100 and the user systems 12 to distribute requests to the application servers 100. In one implementation, the load balancer uses a least connections algorithm to route user requests to the application servers 100. Other examples of load balancing algorithms, such as round robin and observed response time, also can be used. For example, in certain implementations, three consecutive requests from the same user could hit three different application servers 100, and three requests from different users could hit the same application server 100. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039 by Weissman et al., filed Apr. 2, 2004, entitled "Custom Entities and Fields in a Multi-Tenant Database System", and which is hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

One or more of the devices in the environments disclosed herein may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

As used herein, "cloud" is generally intended to refer to a data network or plurality of data networks, often including the Internet. By way of example, client machines located in the cloud may communicate with an on-demand service environment to access services provided by the on-demand service environment. For example, client machines may access the on-demand service environment to retrieve, store, edit, and/or process information.

In some implementations, application servers connected to the network(s) may include a hardware and/or software framework dedicated to the execution of various procedures (e.g., programs, routines, scripts). Some such procedures may include operations for providing the services described herein, such as performing the methods/processes described below with reference to FIGS. 2-8. In alternative implementations, two or more such servers may be included and cooperate to perform such methods, or one or more other servers can be configured to perform the disclosed methods described below.

Figure 2A:
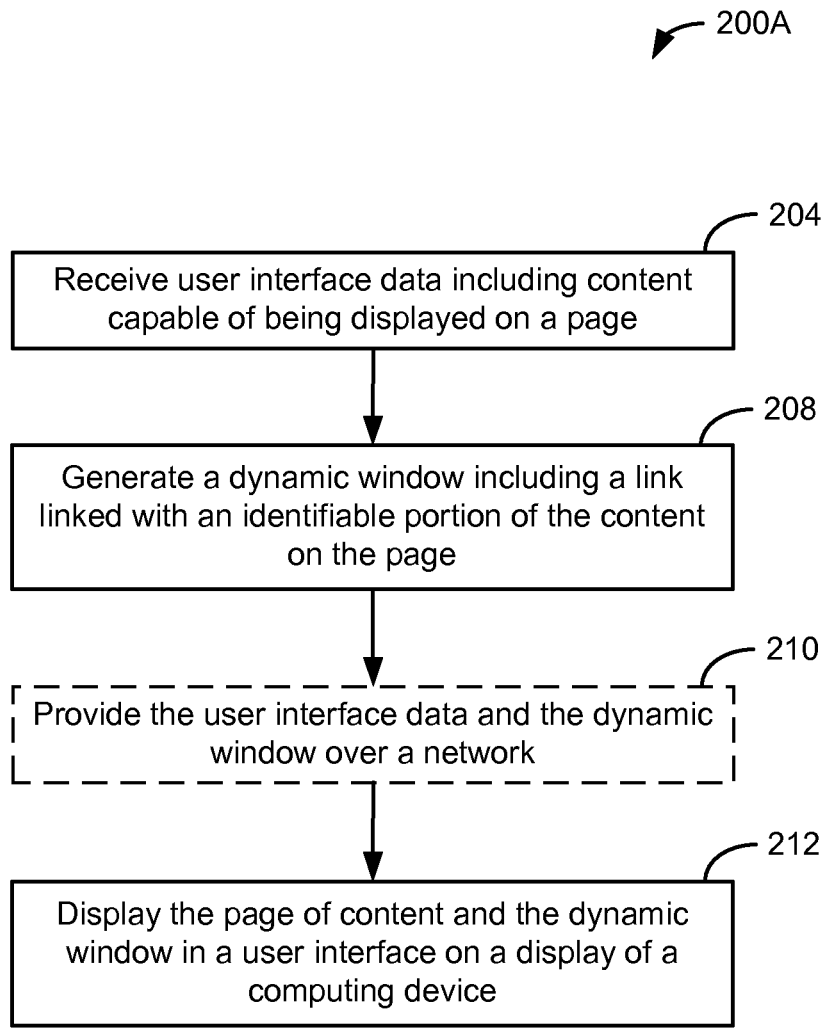
FIG. 2A shows a flowchart of an example of a method 200A of rendering information in a graphical user interface on a display device, performed in accordance with some implementations.

FIG. 2A shows a flowchart of an example of a method 200A of rendering information in a graphical user interface on a display device, performed in accordance with some implementations. In block 204 of method 200A, a user system 12 as described above with reference to FIGS. 1A and 1B receives user interface data including content capable of being displayed on a page, as described in greater detail below with reference to FIGS. 5-8. In an alternative implementation, in block 204, the user interface data is received at a server, for instance, at one of the servers of database system 16, as described above with reference to FIGS. 1A and 1B. For instance, in this alternative implementation, such user interface data can be retrieved from a suitable storage medium, such as tenant data storage 22 and/or system data storage 24.

Figure 5:
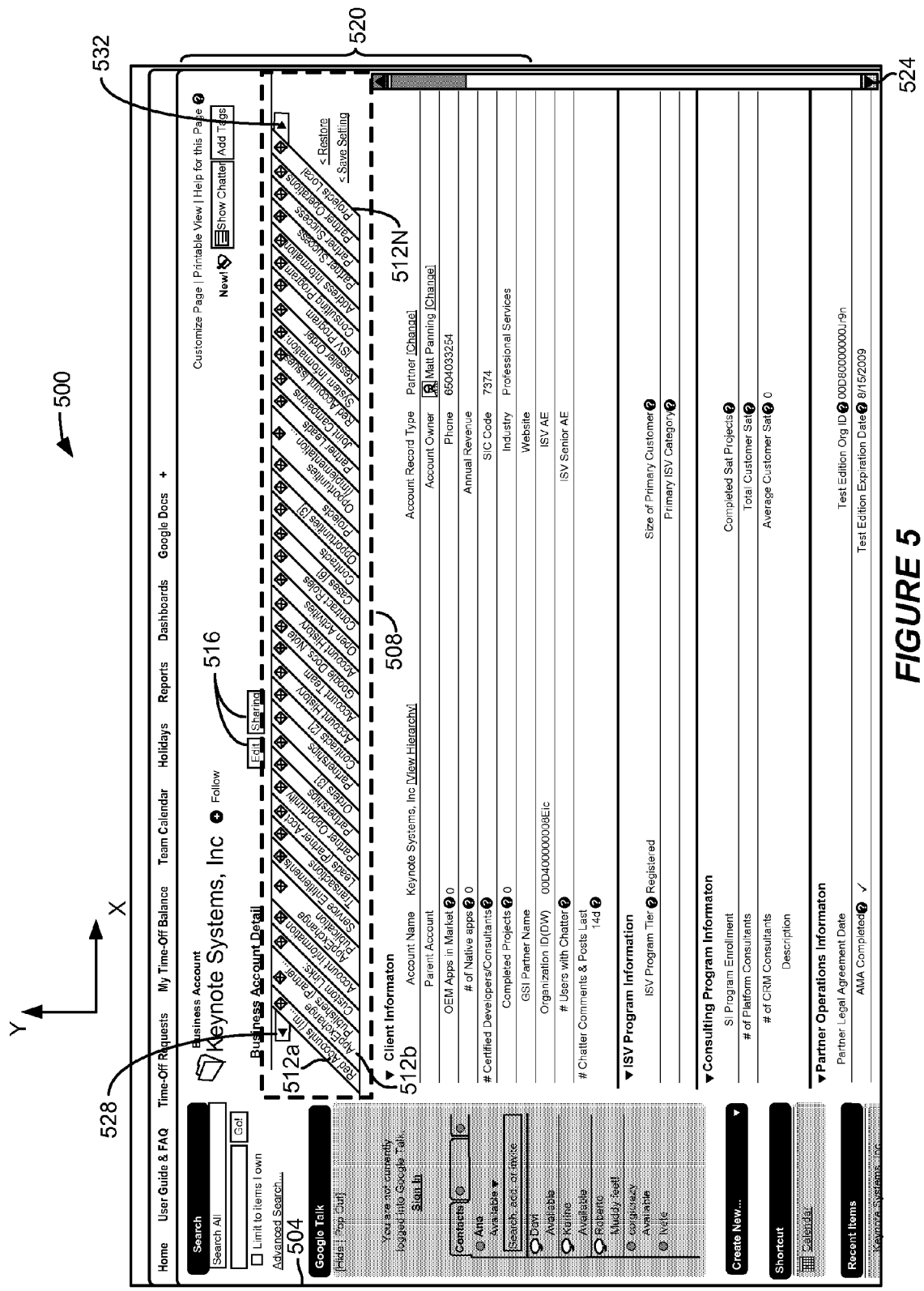
FIG. 5 shows a screen display of an example of a graphical user interface 500 rendered on a computing device, in accordance with some implementations.

When the user interface data of block 204 is received, method 200A proceeds to block 208 in which a dynamic window 508 can be generated, as shown in FIG. 5 by way of example. In some instances, executable code on user system 12, for example, running in conjunction with a web browser program, can be configured to generate dynamic window 508. As shown in FIG. 5, dynamic window 508 can include one or more links 512a-512N, each of which is linked with a respective identifiable portion of the content on page 504. For instance, in FIG. 5, link 512a is linked with a section entitled, "Red Accounts" (not shown in the view of FIG. 5). Also, link "ProjectsLocal" 512N is linked with a heading by the same name at a different location on page 504. The respective identifiable portions, with which the links 512a-512N are associated, are often located at different positions on the page 504, some of which may not be displayed when only a part of the page 504 can be viewed on a display device, as is the case in FIG. 5.

In the alternative implementation described above, in which user interface data is received at a server rather than a user system in block 204 of FIG. 2A, the generation of dynamic window 508 in block 208 can be performed on the server side, for instance, at one of the servers in database system 16. In such alternative implementations, the method 200A proceeds to block 210, in which both the user interface data of block 204 and the dynamic window 508 of block 208 are provided over a network 14 to one or more user systems 12, as shown in FIGS. 1A and 1B. When the dynamic window 508 of block 208 is generated on the client side, for instance, at one or more of user systems 12, block 210 can be omitted. In block 212, a page of content 504 and dynamic window 508 can be displayed in user interface 500 on a display of user system 12, as shown in FIG. 5.

Figure 2B:
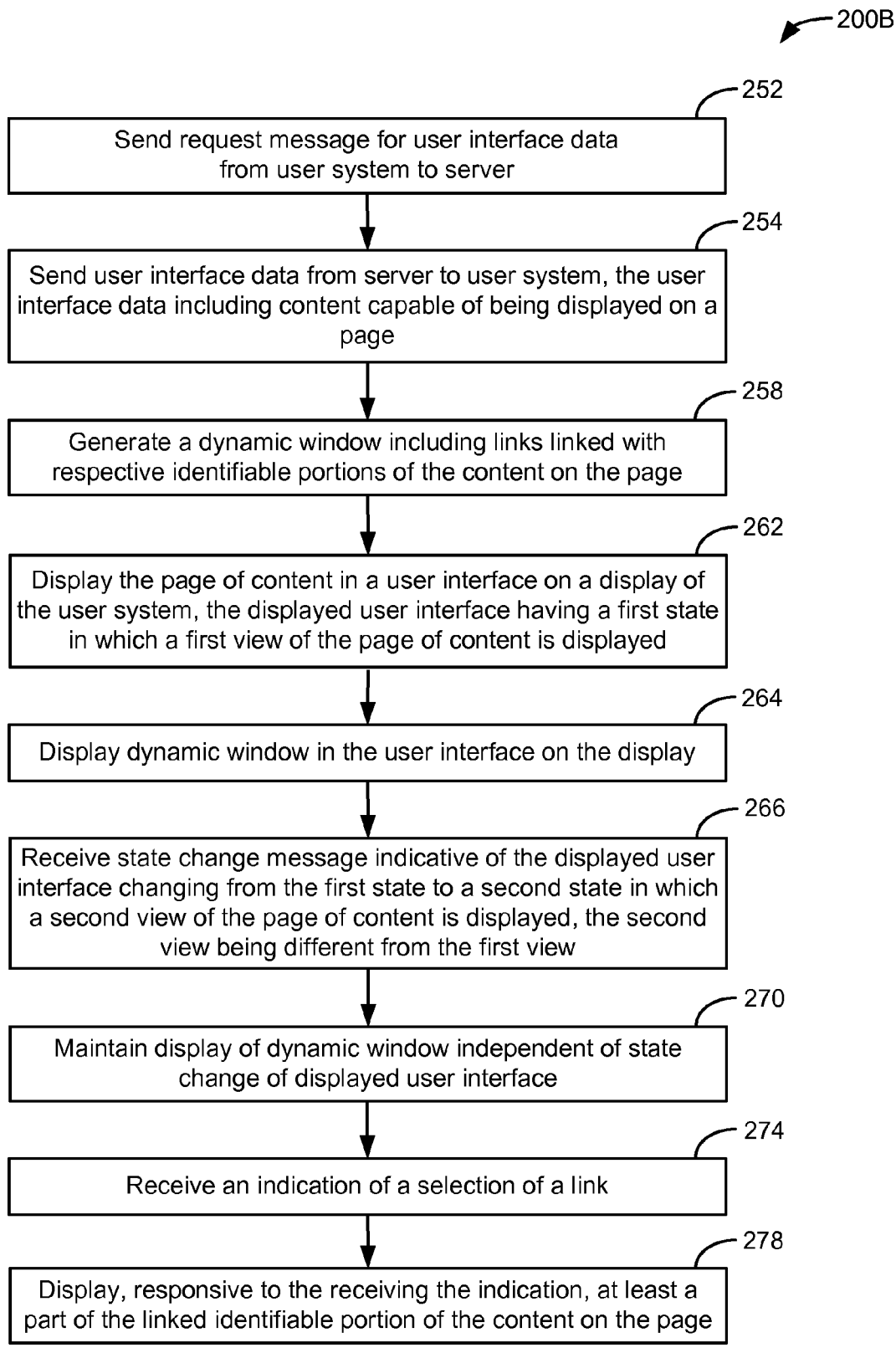
FIG. 2B shows a flowchart of an example of a method 200B of rendering information in a graphical user interface on a display device, performed in accordance with some implementations.

FIG. 2B shows a flowchart of an example of a method 200B of rendering information in a graphical user interface on a display device, performed in accordance with some implementations. In block 252 of method 200B, user system 12 sends a request message for the user interface data to a server, for instance, one of the servers of database system 16 as described above with reference to FIGS. 1A and 1B. In one example, the request message of block 252 comes from a web browser program executing on user system 12. The browser request, in this example, is sent over network 14 to one of the servers. In block 254, in response to receiving the request message of block 252, the server sends the requested user interface data to user system 12. This user interface data includes content capable of being displayed in a page format, as mentioned above with reference to method 200A.

When the user interface data is received at user system 12, in block 258, user system 12 is configured to generate dynamic window 508, as described above, which includes any number of links linked with respective identifiable portions of content on page 504, as shown in FIG. 5. In one example, when the dynamic window generation of block 258 of FIG. 2B is implemented as executable code operating as part of or in conjunction with the web browser program, such code can be configured to populate dynamic window 508 with links 512a-512N, which correspond to identifiable levels of content on the page. For instance, designated sections can be identified at one level, for example, level 1, and a table can be populated with all of the level 1 section names. Each field of this table can be used to generate a corresponding link in dynamic window 508. Additional levels can be specified. For instance, headings in the page content can be coded as level 2, sub-headings designated as level 3, and other types of identifiable portions of content such as audio sources or image data can be designated as having respective different levels. One or more tables can be populated to identify the respective levels of information. In this way, the underlying structure of the respective identifiable portions of page content in the page can be referenced and accessed for dynamic presentation of window 508 to a user, regardless of the actual content of the page.

In block 262 of FIG. 2B, the page 504 of content is displayed in user interface 500 on a display of a computing device, as shown in FIG. 5. In some examples, as mentioned above, the page is vertically longer or otherwise has a larger display area than is capable of being displayed on the particular display device of user system 12. In such cases, often only a portion of a long vertical page is initially displayed on the computing device. This partial view of the page of content represents one of many possible states of the displayed user interface. Additional states can correspond to additional different views of the page. For instance, when a user hits a scroll bar and scrolls down along a partially displayed vertical page, different additional views of the page content are provided and represent respective additional states of the displayed user interface.

In FIG. 2B, in block 264, the dynamic window 508 is displayed in user interface 500 on the display of the computing device. In block 266, a state change message is received at the user system 12 indicating that the displayed user interface has changed from a first state to a second state in which a second view of the page of content is displayed, where the second view is different from the first view as explained above. For example, the state change message of block 266 can be a signal generated as a result of a user pressing a cursor button on a keyboard of user system 12 or clicking a mouse over a scroll bar to scroll up or down or left or right in a partially displayed page of content. These different partial views of the content of page 504 represent respective different states of the displayed user interface 500.

In some implementations, in block 270 of FIG. 2B, when the displayed user interface changes states, e.g., a user hits a scroll bar to display a different partial view of the page, the display of dynamic window 508 is maintained. For instance, in FIG. 5, dynamic window 508 is configured in the shape of a banner, which is persistently displayed regardless of which portion of the page 504 is displayed at any given time in user interface 500. This persistent display of dynamic window 508 is thus maintained independent of any state change of the displayed user interface 500. Thus, in some examples, regardless of which portion of the page of content is displayed in the user interface 500, the position of the banner can be maintained in a designated region of the user interface, such as an upper region 520 as shown in FIG. 5. In this way, a user can easily select and navigate to any of the identifiable portions of content linked with links 512a-512N of dynamic window 508 by clicking on one of the links, regardless of the particular view of page 504 shown at a moment of time.

In block 274 of FIG. 2B, when a user moves a pointer, e.g., using a mouse or other pointing device, over one of the links 512a-512N and selects the link, a message indicating the selection is received at user system 12. Responsive to receiving such an indication of block 274, in block 278, at least a part of the linked identifiable portion of content can then be displayed in the user interface 500. For instance, the view of the page can change so that a section associated with the link is viewable in user interface 500, such as the "Client Information" section of page 504 in FIG. 5. In other examples, a pop-up window is generated to display the linked identifiable portion of content, as described in greater detail below.

Figure 3:
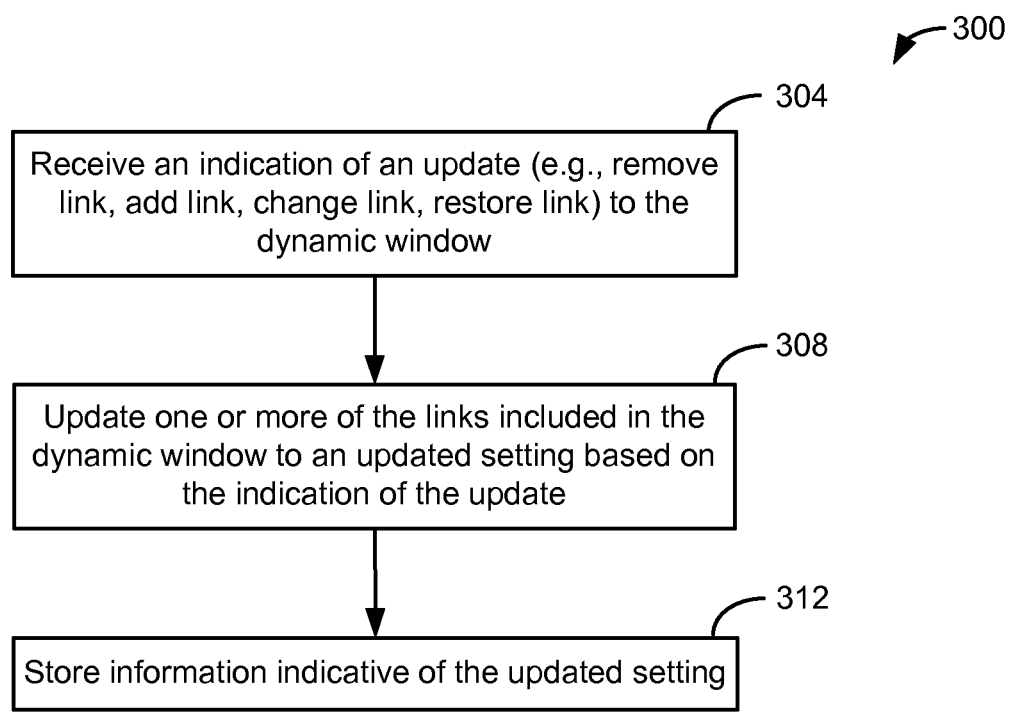
FIG. 3 shows a flowchart of an example of a method 300 of updating a dynamic window in a graphical user interface on a display device, performed in accordance with some implementations.
Figure 6:
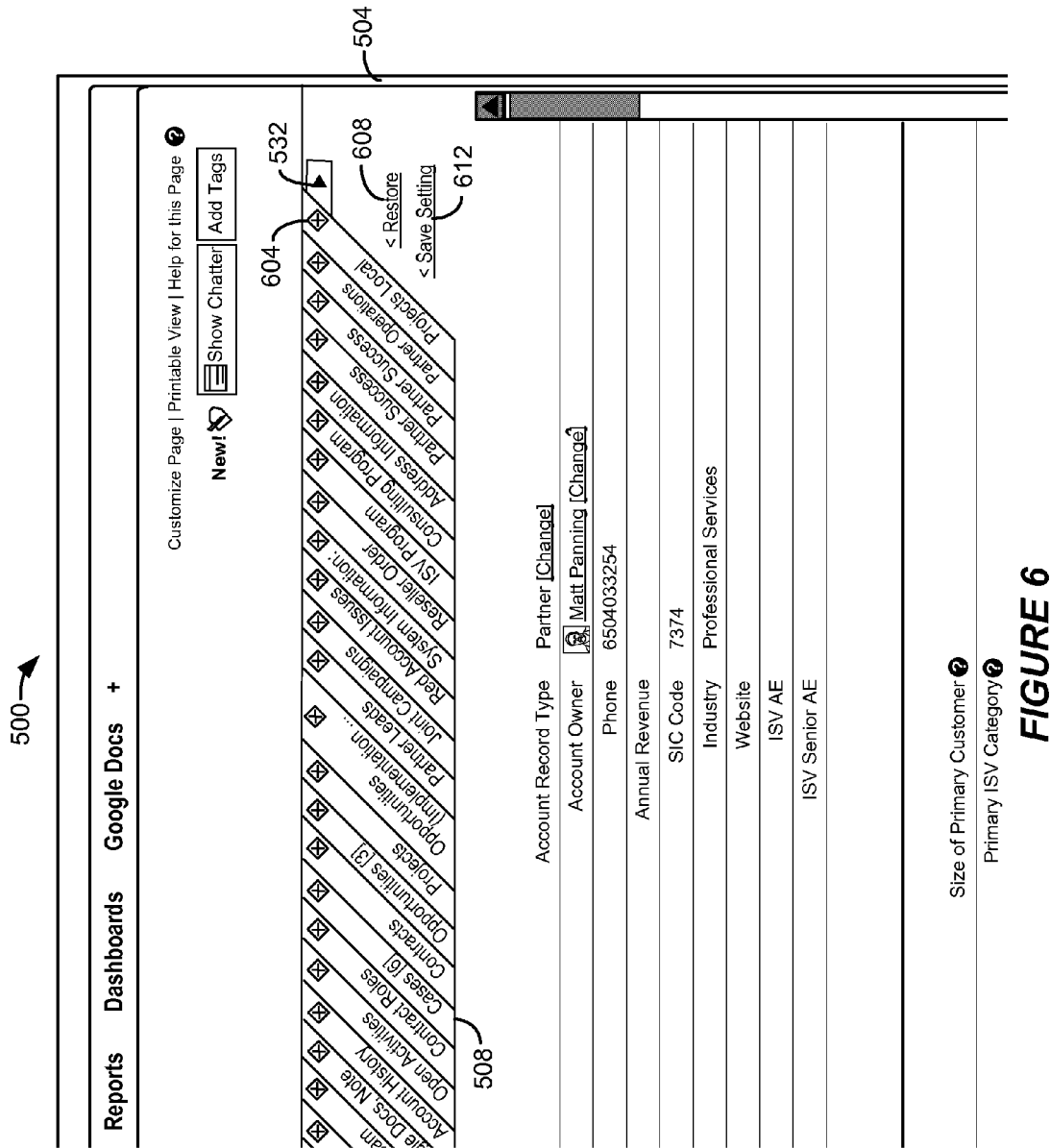
FIG. 6 shows a screen display of an example of a graphical user interface 600 rendered on a computing device, in accordance with some implementations.

FIG. 3 shows a flowchart of an example of a method 300 of updating a dynamic window in a graphical user interface on a display device, performed in accordance with some implementations. In block 304, an indication of an update to the dynamic window 508 is received. For instance, using an input device such as a keyboard or mouse at user system 12, a user can click or otherwise select information to be removed, added, changed, or restored in the dynamic window 508 of FIG. 5. In the case of a banner, as illustrated in FIGS. 5 and 6, individual links 512a-512N in dynamic window 508 are each displayed as having an associated "X" box such as box 604, which a user can click on using a mouse to remove the selected link from dynamic window 508. By the same token, in some implementations, a user can navigate on the page to an identifiable portion of content, select the identifiable portion of content e.g., by double clicking or generating a window around the selected portion of content, and add a link to the selected portion of content to dynamic window 508. The customization of dynamic window 508 in some of the implementations further allows users to refine and more granularly define the parameters of the links. For instance, one or more existing links of dynamic window 508 can be configured to be linked with a different identifiable portion of content on the page, depending on the user's desires when updating the page content. In addition, a "restore" selection 608 in FIG. 6 allows a user to remove any such customization of dynamic window 508 and return dynamic window 508 to its initial setting when dynamic window 508 was first generated.

In block 308 of FIG. 3, in response to receiving such an indication of an update, one or more links 512a-512N are updated accordingly (e.g., removed, added, changed, or restored) to define an updated setting of the dynamic window 508 based on the particular update. In block 312, information indicating the particular updated setting can be stored on a suitable storage medium, for instance, in memory on the computing device serving as user system 12. In an alternative server-based environment, such information indicating the updated setting can be stored on a storage medium accessible to a server, for instance, in database system 16.

When dynamic window 508 is updated, for instance, when a section is changed by being created, modified, or deleted, by way of example, the links 512a-512N can be updated automatically, for instance, in the case of a software application. In other implementations, for instance, when the user interface is displayed as part of a web browser program, the links can be updated when the page 504 displayed by the browser program is refreshed. In other examples, in response to any update to the dynamic window 508, an auto-refresh operation automatically occurs to re-draw the dynamic window 508 to include the updated links or arrangements of links in the window.

Various parameters can be used to control selections of content to be displayed on a page and, accordingly, any links linked with those identifiable portions of content. For instance, a page of content can be customized for a particular user. Various information associated with the user, such as user profile information stored in a user profile, can be used to govern the identifiable portions of content to be displayed on a page delivered to a particular user and, accordingly, the links contained in dynamic window 508 of FIG. 5. One example of such user profile information is a user's security permission level or clearance. For instance, a user having one level of security clearance can request and load a page. A user having this first level of security clearance is able to observe five sections, i.e., five identifiable portions of content on the page with an associated five links. In this example, a different user requests to load the same page. This second user has a second level of security clearance different from the first user. In this example, even though the second user requested the same page, the second user's security clearance only permits the second user to view two identifiable portions of content on the page, as governed by the second user's security level. Thus, the links in the dynamic window 508 for a particular user can be generated for the same page, but the particular links displayed in the dynamic window 508 can be different on a per-user basis to reflect the sections or other identifiable portions of content permitted to be shown on that user's page. In some implementations, the generation of the dynamic window does not occur until a page is loaded in an application executing on the user system or in a web browser program executing on the user system. Responsive to the page being loaded, the method dynamically checks which sections or other identifiable portions of content are included in the page and generates appropriate links to those portions of content. Thus, in some implementations, dynamic windows can be customized for many different users, for instance, in a multi-tenant database environment.

Figure 4:
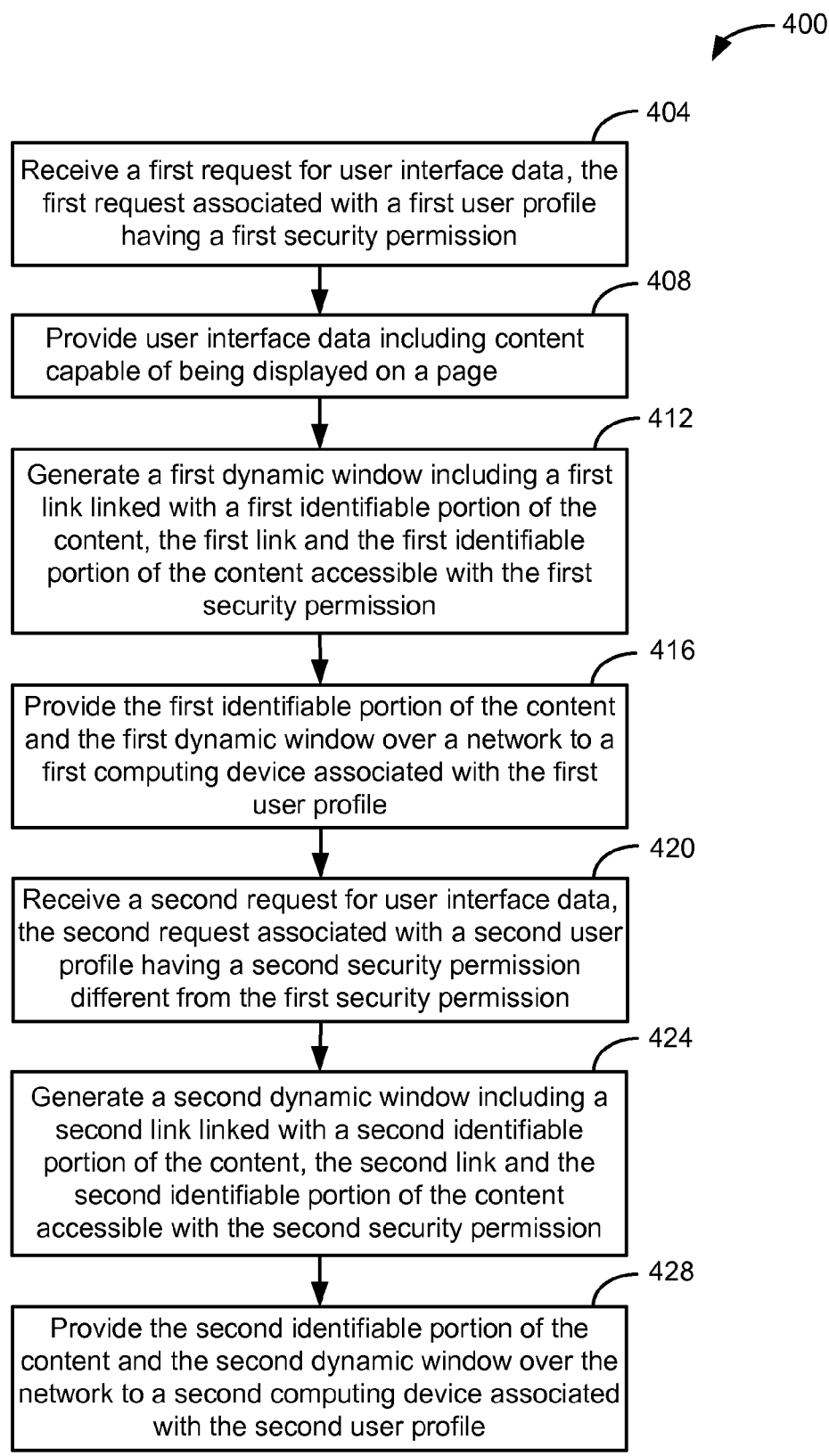
FIG. 4 shows a flowchart of an example of a method 400 of rendering information in graphical user interfaces on computing devices of users having different security permissions, performed in accordance with some implementations.

FIG. 4 shows a flowchart of an example of a method 400 of rendering information in graphical user interfaces on computing devices of users having different security permissions, performed in accordance with some implementations. In block 404, a first request for user interface data is received from a first user system. For instance, this first request can be from a web browser program operating on the first user's computer. In this way, the first request is associated with a user profile of the first user that has a first security permission. Such user profile information, including the first security permission, can be stored as profile data in the first user's profile.

In block 408, responsive to receiving the first request, the requested user interface data is provided. This user interface data includes content capable of being displayed as a page, as described above. In block 412, a first dynamic window is generated. This first dynamic window includes one or more first links linked with respective first identifiable portions of content. Here, the first links and first identifiable portions of content are only accessible to users having the first level of security permission. Thus, such data can be presented to the first user, in this example.

In block 416, the one or more first identifiable portions of content in the first dynamic window are provided over network 14 to the computing device operated by the first user, that is, associated with the first user's profile. Separate and apart from the request and delivery of information to the first user, and in an asynchronous manner, a second request for user interface data can be received in block 420. This second request is received from a second user operating a computing device, where the second user has a second user profile storing or otherwise indicating a second level of security permission different from the first security permission described above.

In block 424, a second dynamic window including one or more second links linked with respective second identifiable portions of the content of the page. Here, the one or more second links and corresponding second identifiable portions of content are accessible with the second security permission. Depending on the particular implementation, the second links and second identifiable portions content may share one or more links and/or pieces of content with the first links and first portions of content, or may be a mutually exclusive different set of links and portions of content for the same requested page. The first links or the second links can be a subset of the other set of links. The links and identifiable portions of content to be included in a particular dynamic window, in some implementations, will depend on the security permission level of the identified user profile, that is, representing the security clearance of the user requesting the data. In block 428, the second identifiable portions of content and the second dynamic window of corresponding second links are provided over network 14 to a user system operated by a second user associated with the second user profile.

FIG. 5 shows a screen display of an example of a graphical user interface 500 rendered on a computing device, in accordance with some implementations. In FIG. 5, the displayed dynamic window 508 overlays at least a portion of the displayed content of page 504. For instance, a portion of the "edit" and "sharing" buttons 516 on page 504 are covered by window 508.

In some implementations, as mentioned above, the dynamic window 508 is persistently displayed regardless of which part of the page 504 is displayed in user interface 500 at a given time. For instance, in the example of FIG. 5, dynamic window 508 is situated in an upper region 520 of displayed user interface 500. Regardless of whether displayed user interface 500 is in a first state corresponding to a first view, in this example, in which an upper part of the page is displayed, or the displayed user interface is in a second state, e.g., when a user clicks on a scroll button 524 to scroll down and view a lower part of page 504, dynamic window 508 remains situated in upper region 520. In some examples, dynamic window 508 is stationary, that is, in a fixed location, regardless of a user scrolling or otherwise changing the partial view of content on the page 504. Thus, in such examples, a banner of links 512a-512N remains visible for selection as a user navigates the page.

The identifiable portions of content that can be linked with links 512a-512N can take various forms. For instance, an identifiable portion of content can be a section, a title, a heading, a sub-heading, a hyperlink, e.g., to a section within a page or to a URL, an image, and/or an audio source. These different types of identifiable portions of content can be listed in various fashions along a dynamic window 508 such as the banner example of FIG. 5. For instance, the links to sections, titles, and headings can be separated and grouped in respective spatial regions within dynamic window 508. In an alternative implementation, regardless of the type of identifiable portion of content, the links to such portions are arranged in alphabetical or other order independent of the type of linked content.

In the example of FIG. 5, all of the links 512a-512N are linearly situated with respect to each other along a horizontal axis in the dynamic window 508. In this example, the horizontal axis is represented, for illustrative purposes only, as an X axis, as shown in FIG. 5. In this example, there is a single row of links 512a-512N in the dynamic window 508, that is, with no additional link or links located above or below the row of links 512a-512N, that is, along the Y axis. In some implementations, such a single row of links is desirable, because a user moving a pointer with a mouse or other pointing device can access any of the links from an appropriate position above or below dynamic window 508, that is, along the Y axis of FIG. 5. In this example, the displayed textual information of links 512a-512N is also rotated as illustrated to have an angled orientation with respect to the Y axis and/or X axis of FIG. 5. In this example, an increased number of links 512a-512N can be shown in the dynamic window 508 by virtue of the angled orientations. As can be seen, even with the angled orientations of the textual links 512a-512N in this example, a user can mouse directly to a particular desired link from above or below dynamic window 508. The user has access from above and below the banner in this example to the displayed link. In this example, there are no intermediate links above or below a particular desired link in window 508 to navigate over to get to the desired link.

The various identifiable portions of content on a page, as described above, often have different locations with respect to one another. For instance, in the example of FIG. 5, the "Client Information" section is located towards upper region 520 of page 504, while other identifiable sections, such as "ISV Program Information," "Consulting Program Information," and "Partner Operations Information," are located in different positions on the page 504 below "Client Information."

Views of a page can change, as described above, depending on the navigation input of a user viewing the page. For instance, by a single click on scroll tab 524, the user can scroll down along page 504 and see additional information. By scrolling down, information in upper region 520 of page 504 may be removed from view. Any change in the view of page content in this manner is considered a separate and distinct "view" from an earlier view. Thus, two different views may share some content on the page. In other examples, two different views of the same page may have entirely different content.

In FIGS. 5 and 6, one example of a dynamic window 508 is the banner as illustrated. In such examples, when more links are desirably included in window 508 than can be displayed on the user interface 500, additional hidden links can be included and accessible by clicking on left scroll button 528 or right scroll button 532. By selecting these scroll buttons, a user can access and display hidden links. For instance, the view of the available links within dynamic window 508 can shift left or right, depending on which scroll button 528 or 532 is selected.

As mentioned above, dynamic window 508 is customizable. That is, a user can remove or add links as desired. In addition, a format of the one or more links can be changed, such as changing the text size, font, language or other formatting parameter of the link. The text or other data displayed as the link can be changed, and the set of links in the dynamic window 508 can be restored to a previous setting, as mentioned above.

Information indicating a previous, current, or updated setting can be stored in different formats and on various storage media, depending on the desired implementation. For instance, in a cloud-based environment, such settings can be stored as part of user profile data maintained at one or more servers, for instance, in a database system 16 of FIGS. 1A and 1B. Thus, when a user logs out of his or her computer to terminate a session and later returns to start a new session, the dynamic window setting from the previous session can be retrieved from the user's profile. In this way, functionality of dynamic window 508 can be restored for the user. In some other implementations, data indicative of a session is maintained in a cookie stored locally in memory at the computing device of user system 12. In such examples, setting information can represent the user profile by being stored in the cookie. Such cookies can alternatively be stored on a server, depending on the desired implementation. User profile information including formatting data for dynamic window settings can be stored at various locations of system 16. For instance, profile information can be stored in application data itself on an app server of the database system. Such user profile information can also indicate what security permission or clearance is available for the particular user, what documents/records the particular user is able to access, what organization(s) the user has access to, and other information.

FIG. 6 shows a screen display of an example of a graphical user interface 600 rendered on a computing device, in accordance with some implementations. In FIG. 6, a save setting selection 612 allows the current state of the one or more links of the dynamic window 508, including the various parameters described above, to be saved. This includes saving the current number of links 512a-512N, textual or other data content of the one or more links, formatting information, and other various setting information.

Figure 7:
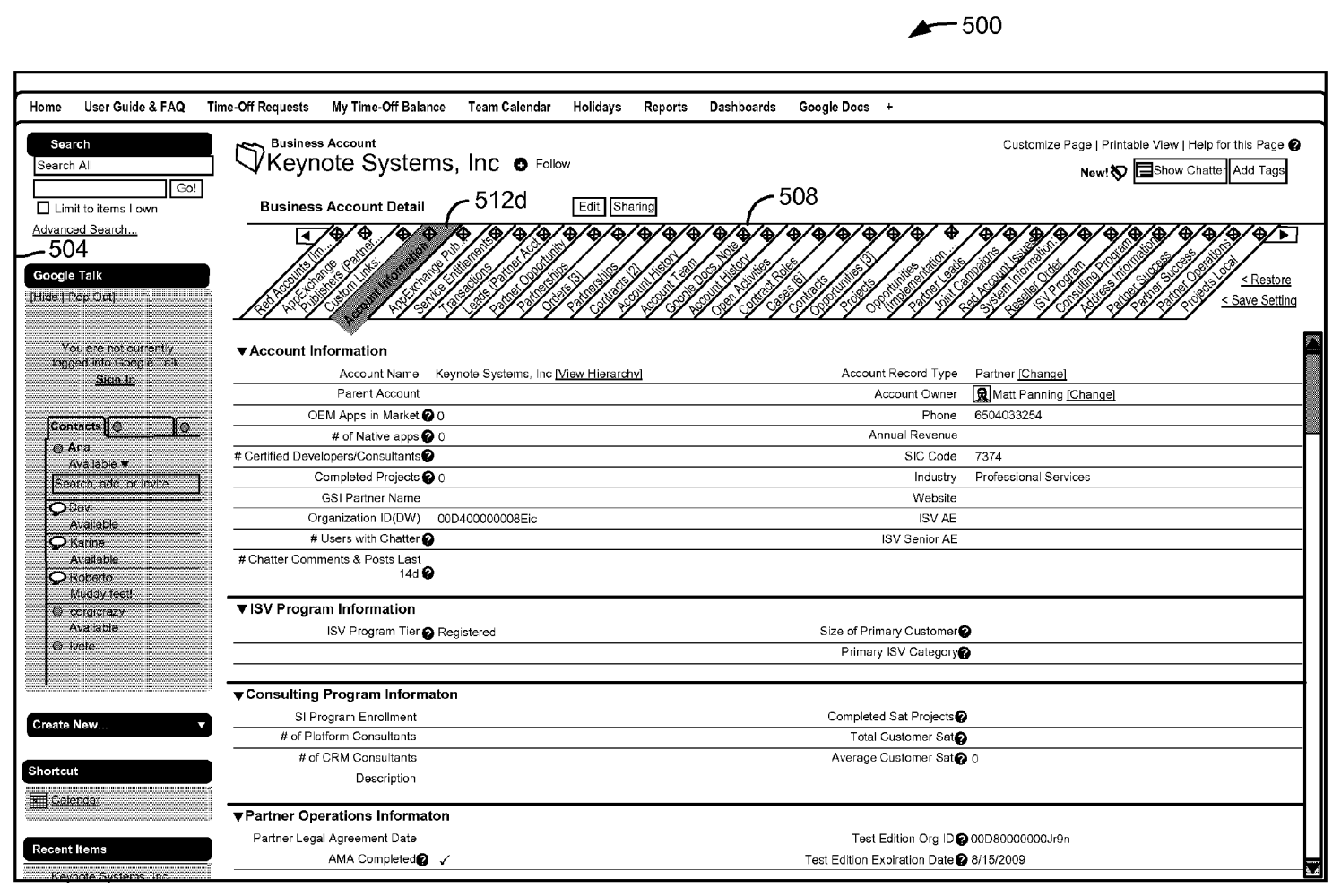

FIG. 7 shows a screen display of an example of a graphical user interface 700 rendered on a computing device, in accordance with some implementations. In FIG. 7, when a user moves a mouse pointer over one of the links in dynamic window 508, such as "Account Information" link 512d, this link is highlighted as a visual cue to the user to indicate the current location of the mouse pointer, as shown in FIG. 7. In this example, links 512a-512N of dynamic window 508 are persistent and do not scroll with the page 504 as the user navigates and accesses different parts or views of the page 504. In this way, regardless of which part of page 504 is shown, a user can instantly access and navigate to a particular identifiable portion of content on the page by clicking on an appropriate one of the links 512a-512N in dynamic window 508.

Figure 8:
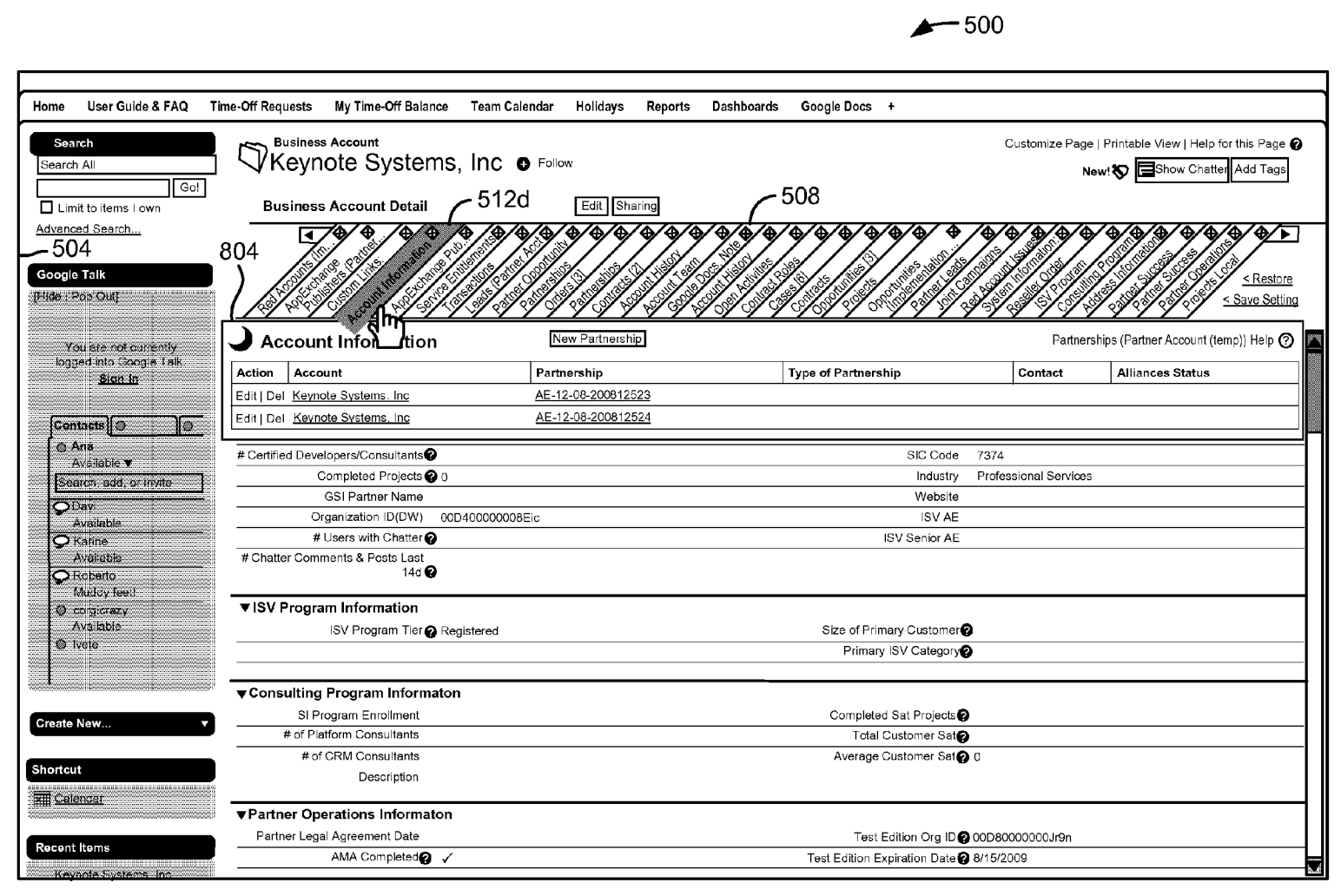

FIG. 8 shows a screen display of an example of a graphical user interface 800 rendered on a computing device, in accordance with some implementations. In FIG. 8, in one example, when the user moves a mouse pointer over a link, such as "Account Information" link 512d, an overlaying window 804 is generated to overlay a part of the displayed content in the present view of the page. In this example, overlaying window 804 includes at least a part of the linked identifiable portion of content, in this case, Account Information. For example, by hovering the mouse pointer over Account Information link 512d, an associated section of account information in the content of page 504 is displayed in window 804, identifying two accounts of "Keynote Systems, Inc." The information in overlaying window 804 can be a snapshot or identical view to the information as it would appear on the page 504, in some examples. In other examples, the information in dynamic window 804 is re-formatted to select and structure the information to fit appropriately into the size of overlaying window 804. In this example, the account information displayed in overlaying window 804 may be edited directly by the user in window 804. In this example, the overlaying window 804 remains displayed as long as the user hovers the mouse pointer over the associated link 512d in dynamic window 508.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand enterprise services environment is implemented in a system having an application server providing a front end for an on-demand database service capable of supporting multiple tenants, the present disclosure is not limited to multi-tenant databases nor deployment on application servers. Implementations may be practiced using other database architectures, i.e., ORACLE®, DB2® by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices. Computer readable media encoded with the software/program code may be packaged with a compatible device or provided separately from other devices (e.g., via Internet download). Any such computer readable medium may reside on or within a single computer program product (e.g., a hard drive or an entire computer system), and may be present on or within different computer program products within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A computer implemented method of rendering information, the method comprising:
   providing link data identifying a plurality of link including a first link linked with a first identifiable portion of content of a page and a second link linked with a second identifiable portion of the content of the page;

causing the page of content and a link presentation including the link data to be displayed in a user interface on a display of a computing device, each link in the link presentation being selectable to cause a respective identifiable portion of the content on the page to be displayed in the user interface, the user interface having a first state in which a first view of the page of content is displayed and the link presentation is displayed in a region of the user interface, the link presentation remaining displayed in the region of the user interface when the user interface has a second state in which a second view of the page of content is displayed, the second view being different from the first view; and causing, responsive to a selection of the first link, the user interface to be updated to display the first view of the page of content, the first view including the first identifiable portion of the content.

2. The computer implemented method of claim 1, wherein the link in the link presentation are linearly situated with respect to each other along an axis of the user interface.

3. The computer implemented method of claim 2, wherein one or more of the link in the link presentation have an angled orientation with respect to the axis of the user interface.

4. The computer implemented method of claim 1, further comprising:

receiving a user-selected update to the link presentation;

causing one or more of the link in the link presentation to be updated to define a personalized presentation based on the user-selected update; and causing the personalized presentation to be displayed in the user interface.

5. The computer implemented method of claim 4, wherein updating the one or more link includes one or more of: removing the one or more link, adding an additional link to the one or more link, changing the one or more link to link with a different one or more identifiable portions of the content on the page, changing a format of the one or more link, changing data of the one or more link, and restoring the one or more link to a previous setting.

6. The computer implemented method of claim 1, wherein the computing device is a mobile device.

7. The computer implemented method of claim 1, further comprising:

receiving an update to the link presentation;

causing one or more of the link in the link presentation to be updated to an updated setting based on the update; and storing information indicative of the updated setting on a storage medium.

8. The computer implemented method of claim 7, wherein the update is related to a user profile.

9. The computer implemented method of claim 1, wherein displaying the page of content and the link presentation includes:

displaying the page of content; and displaying the link presentation such that the link presentation overlays at least a part of the displayed page of content.

10. The computer implemented method of claim 1, wherein:

the first identifiable portion of the content on the page includes one or more of: a section, a title, a heading, a sub-heading, a hyperlink, an image, and an audio source; and the second identifiable portion of the content on the page includes one or more of: a section, a title, a heading, a sub-heading, a hyperlink, an image, and an audio source.

11. The computer implemented method of claim 1, wherein each link of the plurality of link is linked with a respective identifiable portion of the content on the page.

12. The computer implemented method of claim 1, further comprising:

receiving an indication of a selection of the first link; and displaying, responsive to receiving the indication, at least a part of the first identifiable portion of the content.

13. The computer implemented method of claim 12, wherein displaying the at least a part of the first identifiable portion of the content includes:

generating an overlaying window including the at least a part of the first identifiable portion of the content, the overlaying window overlaying at least a part of the displayed page of content.

14. The computer implemented method of claim 1, wherein the first identifiable portion of the content on the page has a first location on the page, and the second identifiable portion of the content on the page has a second location on the page different from the first location.

15. The computer implemented method of claim 1, wherein the first view of the page includes first content, and the second view of the page includes second content different from the first content.

16. The computer implemented method of claim 1, wherein the first view of the page and the second view of the page share a part of the content.

17. The computer implemented method of claim 1, wherein the user interface is displayed by an application running on the computing device.

18. A computer implemented method of rendering information, the method comprising:

providing user interface data including content capable of being displayed on a page;

providing link data identifying a plurality of link including a first link linked with a first identifiable portion of the content of the page and a second link linked with a second identifiable portion of the content of the page;

providing the user interface data and the link data via a network to a computing device, the page of content and a link presentation including the link data capable of being displayed in a user interface on a display of the computing device, each link in the link presentation being selectable to cause a respective identifiable portion of the content on the page to be displayed in the user interface, the user interface having a first state in which a first view of the page of content is displayed and the link presentation is displayed in a region of the user interface, the link presentation remaining displayed in the region of the user interface when the user interface has a second state in which a second view of the page of content is displayed, the second view being different from the first view; and causing, responsive to a selection of the first link, the user interface to be updated to display the first view of the page of content, the first view including the first identifiable portion of the content.

19. A system comprising:

system software stored on a non-transitory data storage medium for execution by at least one server of a database system, the system software operable to cause:

providing user interface data including content capable of being displayed on a page, providing link data identifying a plurality of link including a first link linked with a first identifiable portion of the content of the page and a second link linked with a second identifiable portion of the content of the page, providing the user interface data and the link data via a network, the page of content and a link presentation including the link data capable of being displayed in a user interface on a display of a computing device in communication with the network, each link in the link presentation being selectable to cause a respective identifiable portion of the content on the page to be displayed in the user interface, the user interface having a first state in which a first view of the page of content is displayed and the link presentation is displayed in a region of the user interface, the link presentation remaining displayed in the region of the user interface when the user interface has a second state in which a second view of the page of content is displayed, the second view being different from the first view, and causing, responsive to a selection of the first link, the user interface to be updated to display the first view of the page of content, the first view including the first identifiable portion of the content.

20. The system of claim 19, further comprising:
a storage medium capable of storing the link data.

\* \* \* \* \*